United States Patent [19]
Murphy et al.

[11] Patent Number: 5,224,182
[45] Date of Patent: Jun. 29, 1993

[54] SPATIALLY-WEIGHTED TWO-MODE OPTICAL FIBER SENSORS

[75] Inventors: Kent A. Murphy, Roanoke, Va.; Ashish M. Vengsarkar, Ashville, N.C.; Michael F. Gunther, Blacksburg, Va.; Brian R. Fogg, Blacksburg, Va.; Richard O. Claus, Christiansburg, Va.

[73] Assignees: Virginia Polytechnic Institute and State University; Virginia Tech Intellectual Properties, Inc., both of Blacksburg; Center for Innovative Technology, Herndon, all of Va.

[21] Appl. No.: 751,738
[22] Filed: Aug. 29, 1991
[51] Int. Cl.[5] .................................................. G02B 6/02
[52] U.S. Cl. ........................................ 385/12; 385/43; 385/48
[58] Field of Search .................... 385/12, 13, 43, 48

[56] References Cited
U.S. PATENT DOCUMENTS 4,787,689 11/1988 Korotky et al. ................. 385/43 X
4,804,248 2/1989 Bhagavatula ..................... 385/43 X

OTHER PUBLICATIONS

Vengsarkar et al, "Elliptical-Core, Two-Mode Optical Fibre Sensors as Vibration-Mode Filters", *Electronics Letters*, vol. 27, Jun. 1991, pp. 931-932.

Primary Examiner—John D. Lee
Assistant Examiner—Phan T. Heartney
Attorney, Agent, or Firm—Whitham & Marhoefer

[57] ABSTRACT

Tapered two-mode optic fibers are used as sensors with sensitivity varying as a function of length. The optical fiber sensors act as vibrational-mode filters thereby performing initial signal processing of the sensor signal. The sensors are based on the differential propagation constant in a two-mode fiber that is directly dependent on the normalized frequency or V-number. Tapering the fiber changes the V-number and hence can change the sensitivity of the sensor along its length. By choosing an appropriate weighting function in the manufacture of the sensor, it is possible to implement vibrational-mode analysis, vibrational-mode filtering and other functions that are critical in control system applications.

5 Claims, 14 Drawing Sheets

SPATIALLY-WEIGHTED TWO-MODE OPTICAL FIBER SENSORS

CROSS-REFERENCE TO RELATED APPLICATION

This application is related in subject matter to co-pending application Ser. No. 07/751,737 filed concurrently herewith by Ashish Vengsarkar, Kent A. Murphy, Brian Fogg, Jonathan Greene, and Richard O. Claus for "Fiber Optic Grating-Based Weighted, Two-Mode Fiber Sensors" and assigned to a common assignee. The disclosure of application Ser. No. 07/751,737 is incorporated herein by reference.

DESCRIPTION

Background of the Invention

1. Field of the Invention

The present invention generally relates to fiber optic sensors for vibration analysis and, more particularly, to a fiber optic sensor wherein the sensitivity of the sensors is varied along the length of the fiber by tapering two-mode, circular-core fibers allowing for a weighted/distributed measurement along its length.

2. Description of the Prior Art

Phase modulated optical fiber sensors have emerged as viable alternatives to conventional electrical sensing techniques over the last ten years as reported, for example, in J. Dakin and B. Culshaw, *Optical Fiber Sensors, Principles and Components*, Artech House (1988), and E. Udd, Ed., *Fiber Optic Sensors: An Introduction for Engineers and Scientists*, Wiley-Interscience (1991). Among the several choices available for sensor implementation, two-mode fiber sensors that operate on the principle of differential-phase modulation between the $LP_{01}$ and $LP_{11}^{even}$ modes have been extensively developed for practical, ruggedized applications as described by B. Y. Kim, J. N. Blake, S. Y. Huang, and H. J. Shaw, "Use of Highly Elliptical Core Fibers for Two-Mode Fiber Devices", *Opt. Lett.*, vol. 12, p. 729, 1987, and B. Y. Kim, J. N. Blake, S. Y. Huang, and H. J. Shaw, "Strain Effects on Highly Elliptical Core Fibers", *Opt. Lett.*, vol. 12, p. 732, 1987. Although a few orders of magnitude less sensitive than their single-mode counterparts, two-mode fiber sensors present design simplicity and can be operated in a stable fashion over long periods of time without invoking the need for complex stabilization schemes as in the case of single-mode Michelson and Mach-Zehnder configurations.

Fiber optic sensors have been used in the past for the measurement of several different parameters such as strain, temperature, pressure, electric and magnetic fields and vibration. Specifically two-mode elliptical-core (e-core) fibers have been used as efficient vibration mode sensors when operated in a linear region. K. A. Murphy, M. S. Miller, A. M. Vengsarkar, and R. O. Claus in "Elliptical-core Two-mode, Optical Fiber Sensor Implementation Methods", *J. Lightwave Technol.*, vol. 8, p. 1688, 1990, showed that these ruggedized e-core sensors could perform as vibration-mode filters when placed appropriately along the vibration antinodes of a beam. The authors also proposed the feasibility of applying a weighting function to the differential propagation constant of the sensor to alter its sensitivity in the longitudinal direction.

The motivation for fabricating a sensor with a variable sensitivity along its length can be easily understood when the problem is attacked from a control systems viewpoint. Current research in vibration sensing and control has shown that variable-sensitivity, spatially-distributed transducers may be more suitable than point sensors for optimal control architectures. See, for example, A. M. Vengsarkar, B. R. Fogg, W. V. Miller, K. A. Murphy, and R. O. Claus, "Elliptical-core, Two-mode Optical Fibre Sensors as Vibration Mode Filters", *Electron. Lett.*, vol. 27, pp. 931-932, June 1991, and T. Bailey and J. E. Hubbard, "Distributed Piezoelectric-Polymer Active Vibration Control of a Cantilever Beam", *J. Guid. and Control.*, vol. 8, pp. 605-611, 1985. Discrete point sensors have been shown to suffer form actuator/observer spillover leading to instabilities in the closed-loop system by C. -K. Lee and F. C. Moon in "Modal Sensors/actuators", *J. Appl. Mechanics*, vol. 57, pp. 434-441, 1990. The development of piezo-electric spatially weighted sensors has led to extensive research on the advantages of modal sensors and actuators. Modal sensors, which sense the modal coordinate of a particular vibration mode of a structure, can be operated within a control system without extensive on-line real-time computation requirements. In their first description of modal sensors, Lee and Moon made sensing elements out of polyvinylidene fluoride (PVDF) films shaped in the form of specific modes of a structure. The fundamental difference in operation between distributed modal sensors and conventional point sensors, as viewed by control system analysis, is that flexible structures and distributed sensors are both infinite dimensional systems and hence compatible, whereas conventional point sensors are finite dimensional systems and hence require extensive signal processing techniques.

What is needed for optimal control architectures are variable sensitivity, spatially distributed transducers. Such transducers would be capable of picking up information selectively along its length and would have applications in the aerospace, high temperature chemical process, and mining industries, among others. For example, sensors of this type could be used in vibration suppression in a variety of machinery.

SUMMARY OF THE INVENTION

It is therefore an object of the present invention to provide distributed modal sensors using optical fiber techniques which sensors permit specific modal information to be extracted without the use of extraneous signal processing techniques thereby effectively performing the task of optically filtering out information not relevant to the next stage of the system.

It is another object of the invention to provide optical fiber sensors capable of measuring strain/vibration and having variable sensitivity and weighting functions which can be tailored for specific applications.

According to the invention, a new type of vibration sensor based on two-mode optical fibers is provided. These sensors are based on the differential propagation constant in a two-mode fiber that is directly dependent on the normalized frequency or V-number. Tapering the fiber changes the V-number and hence can change the sensitivity of the sensor along its length. The optical fiber sensors according to the invention are analogs of shaped, piezo-electric modal sensors that have emerged recently in the area of structural control and demonstrate their applications for clamped-clamped and clamped-free one-dimensional beams.

By choosing an appropriate weighting function in the manufacture of the sensor, it is possible to implement vibrational-mode analysis, vibrational-mode filtering and other functions that are critical in control system applications. The invention provides a sensor which acts as a vibrational-mode filter. This tailoring of the sensor to specific applications allows the sensor to play the role of both transducer and signal processing element.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Theory

Figure 1A:
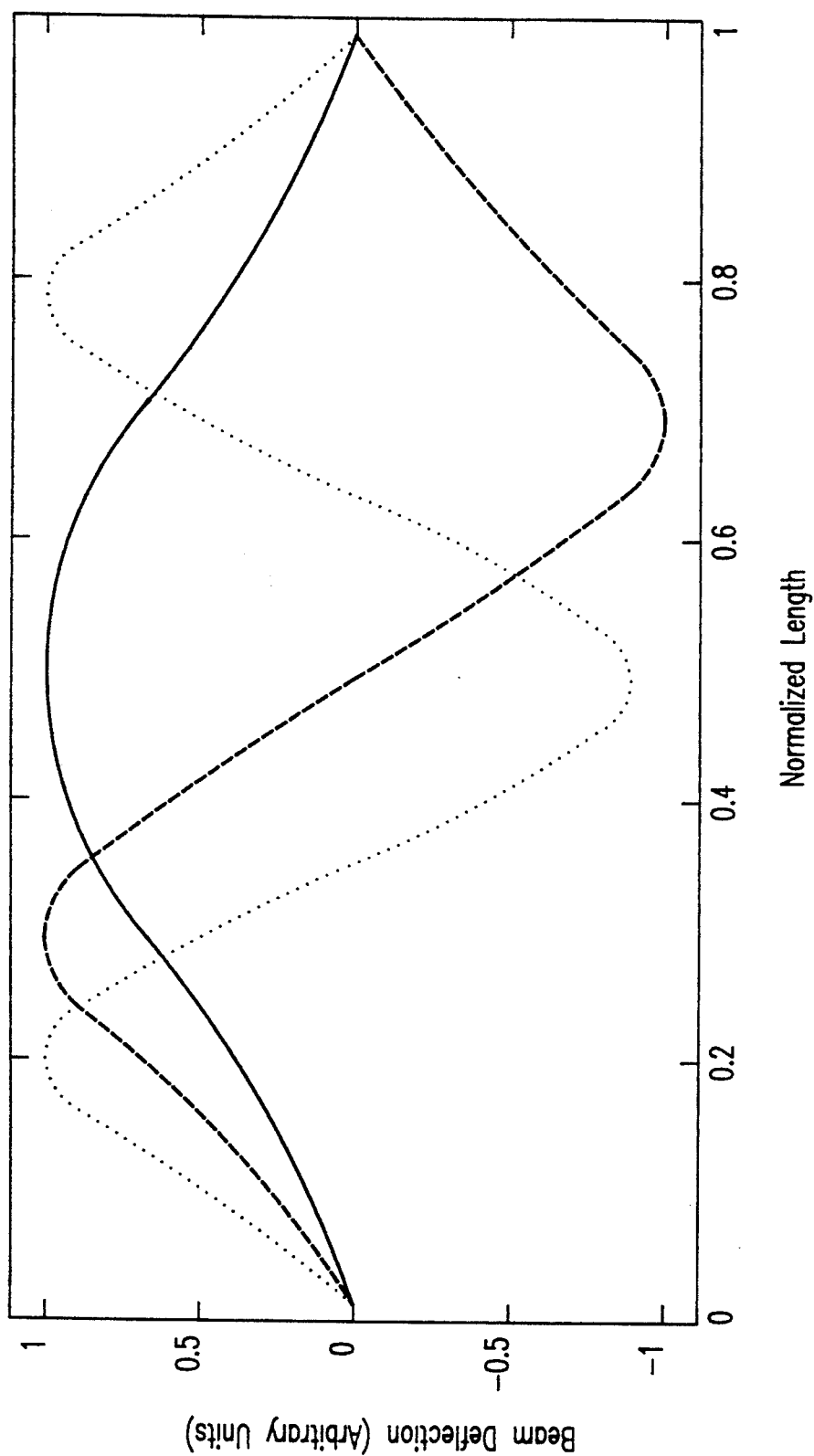
FIG. 1A and 1B are graphs showing three vibration mode shapes for clamped-clamped beam and clamped-free beam, respectively.

The Euler equation for transverse vibration of beams is given by $$\frac{\partial^2}{\partial x^2}\left[EI(x)\frac{\partial^2}{\partial x^2}y(x,t)\right] + p_l(x)\frac{\partial^2}{\partial t^2}y(x,t) = Q(t), \quad (1)$$

where E is Young's Modulus, I(x) is the Moment of Inertia, $p_l$ is the linear density, Q(t) is the forcing function, and y(x,t) is the transverse displacement of the beam. Assuming the beams to be approximately isotropic, Equation (1) can be simplified to $$EI\frac{\partial^4}{\partial x^4}y(x,t) + p_l\frac{\partial^2}{\partial t^2}y(x,t) = Q(t). \quad (2)$$

Using the method of separation of variables, a solution is attempted in the form of $$y(x,t) = \sum_{n=1}^{\infty} \psi_n(x)\eta_n(t), \quad (3)$$

where $\psi_n(x)$ represent the mode shapes of the beam and $\psi_n$ represent the modal amplitudes. This approach necessitates an infinite sum of natural modes to completely describe the behavior of the beam. For practical implementation, this model can later be truncated to the first few modes of interest. Substituting Equation (3) into Equation (2) and setting the forcing function, Q(t), to zero, one can solve independently for the functions $\psi_n(x)$ and $\eta_n(t)$ and arrive at a solution for the different modes of vibration of the beam. The equation for $\psi_n(x)$, given by $$\frac{\partial^4}{\partial x^4}\psi_n(x) - \frac{p_l a_n^2}{EI}\psi_n(x) = 0 \quad (4)$$

has a closed form solution determined by the boundary conditions of the beam. For a clamped-clamped configuration, the boundary conditions are given by $$\psi_n(x=0,L)=\psi'_n(x=0,L)=0, \quad (5)$$

leading to the general solution, namely, $$\psi_n(x) = \frac{1}{\sqrt{L}}[\cosh(a_n x) - \cos(a_n x) + \kappa_n(\sinh(a_n x) - \sin(a_n x))] \quad (6a)$$

where $$\kappa_n = \frac{\cos(a_n L) - \cosh(a_n L)}{\sinh(a_n L) - \sin(a_n L)} \quad (6b)$$

and $a_n$ is the characteristic value of nth mode determined from the equation, $$\cos(a_n L)\cosh(a_n L) - 1 = 0 \quad (6c)$$

Similarly, for a clamped-free beam (cantilever configuration), the boundary conditions are expressed mathematically as $$\psi_n(=0)=\psi'_n(x=0)=0 \quad (7a)$$

and $$\psi_n''(x=L)-\psi_n'''(x=L)=0, \quad (7b)$$

and there is obtained the resulting solution, $$\psi_n(x) = \frac{1}{\sqrt{L}}[\cosh(a_n x) - \cos(a_n x) + \kappa_n(\sinh(a_n x) - \sin(a_n x))] \quad (8a)$$

where $$\kappa_n = \frac{\cos(a_n L) + \cosh(a_n L)}{\sin(a_n L) + \sinh(a_n L)} \quad (8b)$$

and $a_n$ is a characteristic value given by $$\cos(a_n L)\cosh(a_n L) + 1 = 0 \quad (8c)$$

Figure 1B:
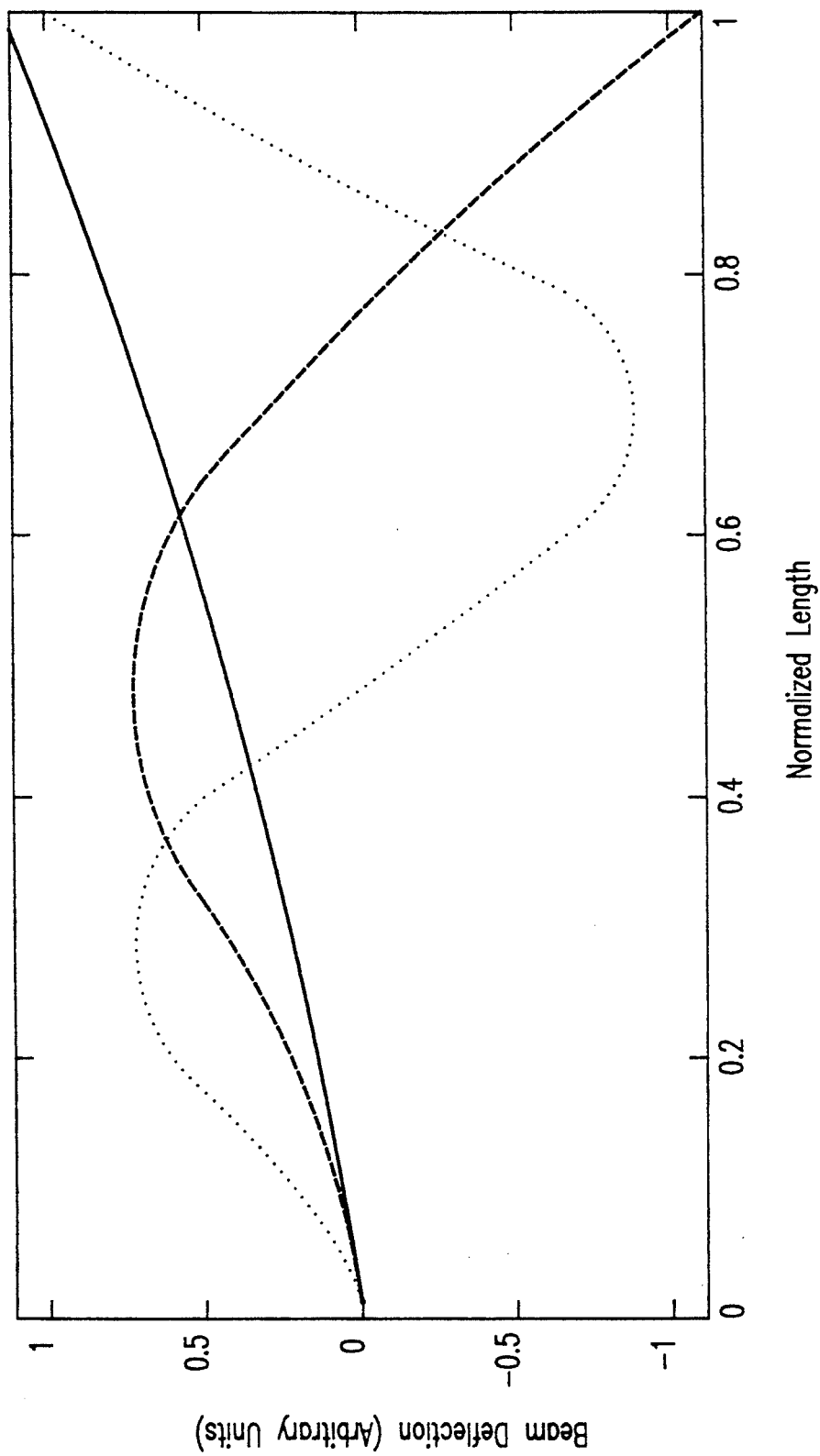

The first three modes of vibration for a clamped-clamped and a clamped-free beam are shown in FIGS. 1A and 1B, respectively. In these figures, the solid line is the first mode of vibration, the dashed line is the second mode of vibration, and the dotted line is the third mode of vibration. The key to the weighted sensing approach is that the mode shapes are orthogonal, i.e., $$\int_0^L \psi_m(x)\psi_n(x)dx = \delta_{mn}, \quad (9)$$

where $\delta_{mn}$ is the Kronecker delta and L is the length of the beam. This property is used in the design of the fiber-based vibration-modal sensors according to the present invention.

The Fiber Sensor

Figure 2:
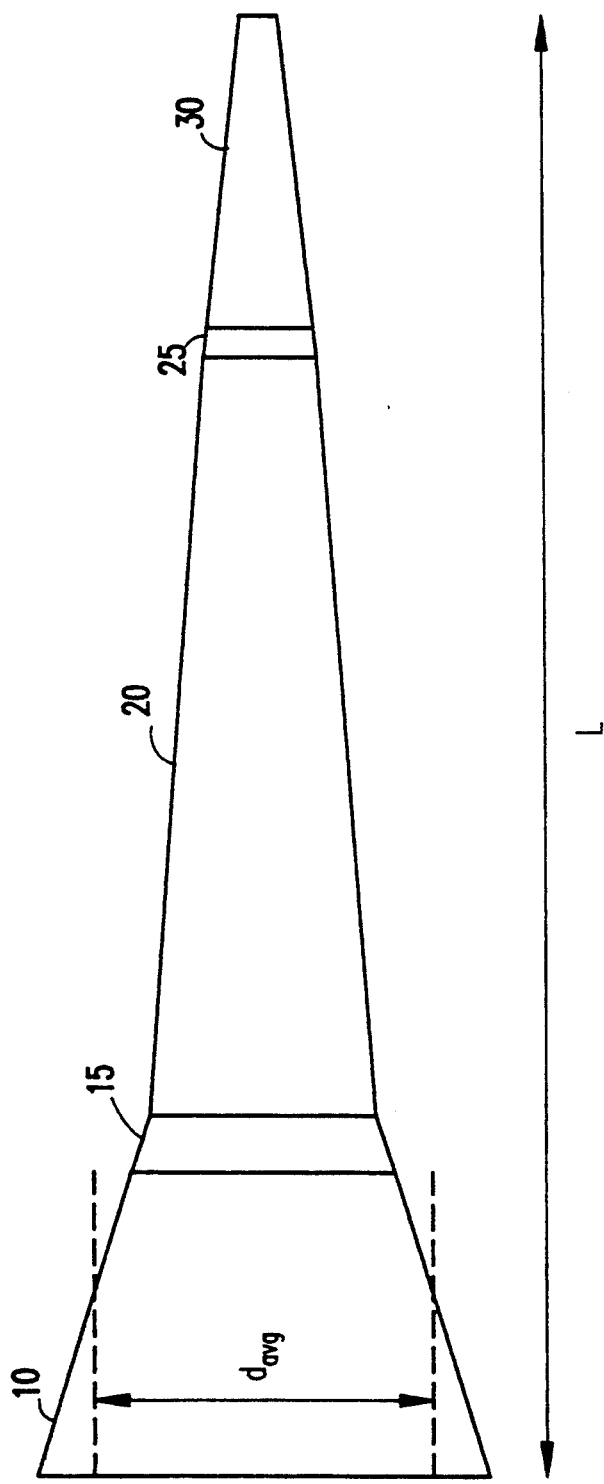
FIG. 2 is a simplified side view of a tapered fiber sensor according to the invention.

The fiber sensor operates on the principle of differential phase-modulation between the $LP_{01}$ and $LP_{11}^{even}$ modes. The basic form of the fiber sensor is shown in FIG. 2 and consists of three different fiber sections fusion spliced to each other. The first section 10 is an e-core single-mode fiber which is used as the lead-in fiber. The second section 20 is a two-mode e-core fiber which comprises the sensing section. The third section 30 is a circular core multimode fiber which acts as the lead-out fiber. Linearly polarized light is launched parallel to the major axis of the ellipse of the single mode lead-in fiber 10. The polarization preserving properties of the e-core fiber make this fiber section relatively insensitive to external perturbations. At the first fusion splice 15, the ellipses of the single-mode and the dual mode fibers are aligned. At the second fusion splice 25, the axes of the sensing fiber 20 and the circular core multimode fiber 30 are offset from each other. This allows the lead-out fiber 30 to pick up only one of the lobes of the spatial interference pattern resulting from the interaction between the $LP_{01}$ and $LP_{11}^{even}$ modes in the sensing fiber. The result is a time varying intensity at the output of the multimode fiber 30 in response to an environmental disturbance in the sensing fiber region. The fused lead-out fiber thus acts as a ruggedized, low-profile spatial filter.

A detailed theoretical analysis of two-mode, e-core fiber sensors has been presented by A. Kurnar and R. K. Varshney in "Propagation Characteristics of Dual-Mode Elliptical-Core Optical Fibers", *Opt. Lett.*, vol. 14, pp. 817–819, 1989, and by J. K. Shaw, A. M. Vengsarkar, and R. O. Claus in "Direct Numerical Analysis of Elliptical-Core, Two-Mode Fibers", *Opt. Lett.*, vol. 16, pp. 135–137, 1991. An experimental evaluation of the effect of external perturbations on two-mode, e-core fibers was performed by S. Y. Huang, J. N. Blake, and B. Y. Kim as reported in "Perturbation Effects on Mode Propagation in Highly Elliptical Core Two-Mode Fibers", *J. Lightwave Technol.*, vol. 8, pp. 23–30, 1990. In the following description, the analysis is restricted to the nature of the output signals and their dependence on the differential propagation constant, $\Delta\beta$ ($\Delta\beta = \beta_{01} - \beta_{11}$). Although the degeneracy of $LP_{11}^{even}$ and $LP_{11}^{odd}$ modes in circular-core fibers makes the operation of such a sensor difficult in practice, practical constraints (such as the unavailability of facilities to draw e-core, tapered fibers) have limited experimental results to circular-core fiber sensors. As a result, the analysis presented pertains to circular-core fiber theory; however, it should be noted that the use of circular-core fibers for two-mode sensing applications is not a severe handicap as far as the interpretation of results is concerned. Prior to the advances in e-core fiber devices, M. R. Layton and J. A. Bucaro reported in "Optical Fiber Acoustic Sensor Utilizing Mode-Mode Interference", *Appl. Opt.*, vol. 18, pp. 666–670, 1979, that they had used few-mode, circular core fibers for sensing applications and B. D. Duncan reported in "Modal Interference Techniques for Strain Detection in Few-Mode Optical Fibers", Master of Science Thesis, Bradley Department of Electrical Engineering, Virginia Polytechnic Institute and State University, April 1988, that excellent results were obtained using circular-core fibers with special launch conditions.

The output signal from a two-mode fiber sensor is sinusoidal and can be expressed as $$I(t) = I_0 + I_{ac}\cos[\phi(t)], \quad (10)$$

where $\phi$ is the phase difference between the $LP_{01}$ and the $LP_{11}^{even}$ modes and can be written as $$\phi(t) = \int_a^b \Delta\beta(x)\epsilon(x,t)dx, \quad (11)$$

where $\epsilon$ is the strain experienced by the fiber, $\Delta\beta$ is the difference in the propagation constants of the $LP_{01}$ and the $LP_{11}^{even}$ modes, x denotes the longitudinal direction along the fiber axis, and a and b denotes the two endpoints of the two-mode sensing region of the fiber. In Equation (11), the explicit dependence of $\Delta\beta$ on x implies that the strain sensitivity can be a function of the length along the beam.

System Analysis

In order to evaluate the vibration modes of the beam, the strain is expressed as $$\epsilon(x,t) = \frac{\partial^2 y(x,t)}{\partial x^2}, \quad (12)$$

where y(x,t) denotes the deflection of the beam away from its equilibrium point. For a conventional two-mode fiber (with $\Delta\beta(x) = \Delta\beta = $ constant), the expression for the sensor output as a function of the slopes of the deflections at the endpoints is obtained by substituting Equation (12) into Equation (11), viz., $$I(t) = I_0 + I_{ac}\cos\left[\Delta\beta\left(\left.\frac{\partial y}{\partial x}\right|_{x=b} - \left.\frac{\partial y}{\partial x}\right|_{x=a}\right)\right]. \quad (13)$$

The plots of the first three natural modes of vibration for a clamped-clamped beam are shown in FIG. 1B. Note that at a normalized length of 0.5, the slopes of the first and the third modes are zero. Hence, a sensor with endpoints at $x=0$ and $x=0.5$ should not be sensitive to these modes. Similarly, a sensor placed between $x=0.75$ and $x=1$ will not pick up the second mode and will be sensitive to the first and third modes of vibration. While proper placement of fiber sensors can thus lead to an elimination of some of the modes for a clamped-clamped beam, filtering out information from individual modes (or achieving the same effect for a clamped-free beam where the slope of the deflection is not zero at the free end) is still not possible.

It is possible, however, to weight the information actually present in the structure by using a priori knowledge of the mode shapes of the structure. Instead of relying on the sensor placement to enable structural mode analysis, it would be advantageous if the sensor itself could provide the weighting capability. To analyze such a sensor fabricated from tapered two-mode fibers, the differential propagation constant, $\Delta\beta$, should now be considered to be an explicit function of x. Substituting Equation (12) into Equation (11) and integrating by parts leads to the equation $$\phi(t) = \eta_n(t)\left( Q(a,b) + \int_a^b \Delta\beta''(x)\psi_n(x)dx \right). \quad (14a)$$

where $$Q(a,b) = [\Delta\beta(x)\psi_n'(x)]_a^b - [\Delta\beta'(x)\psi_n(x)]_a^b \quad (14b)$$

and the primes indicate spatial derivatives with respect to x. Comparing Equations (14a) and (9) leads one to pick a possible weighting function given by $\Delta\beta''(x) = \psi_m(x)$. Except for the contributions of $Q(a,b)$, $\phi(t)$ would filter out all but the mth mode for a fiber sensor spanning the entire length of the beam. Hence, fairly mode-specific information can be acquired without resorting to conventional analog or digital post acquisition processing. The function $Q(a,b)$ is essentially a constant once the fiber sensor has been attached to or embedded in the structure of interest. For a clamped-clamped beam, if the sensor gauge length spans the entire beam, $Q(a,b)$ is identically equal to zero irrespective to the weighting function.

Previous research in the analysis of tapered in *Theory of Dielectric Waveguides*, Second Ed., Academic (1991), and A. W. Snyder and J. D. Love, *Optical Waveguide Theory*, Chapman & Hall (1983), where the behavior of the propagating modes is analyzed in terms of a coupled-mode formalism that considers the taper as a perturbation. Numerical techniques such as the beam propagation method (BPM) first developed for graded-index fibers can also be used for such analyses. See M. D. Feit and J. A. Fleck, "Light Propagation in Graded-Index Optical Fibers", *Appl. Opt.*, vol. 17, pp. 3990-3998, 1978, M. D. Feit and J. A. Fleck, "Calculation of Dispersion in Graded-Index Multimode Fibers by a Propagating Beam Method", *Appl. Opt.*, vol. 18, pp. 2843-2851, 1978, and J. Van Roey, J. Van der Donk, and P. E. Lagasse, "Beam Propagation Method: Analysis and Assessment", *J. Opt. Soc. Am.*, vol. 71, pp. 803-810, 1981. L. Bobb, P. M. Shankar, and H. D. Kromboltz provide in "Bending Effects in Biconically Tapered Single-Mode Fibers", *J. Lightwave Technol.*, vol. 8, pp. 1084-1090, 1990, a complete theory for the analysis of biconical tapers and bends in single-mode fibers. Most such techniques rely heavily on numerical evaluation of the solutions and, in the process, are prone to losing physical insight of the problem at hand. In the following description, the problem is considerably simplified by assuming the fiber to be made up of discrete segments, each with its own differential propagation constant and each section acting as a waveguide independent of the section preceding or following it. In the model shown in FIG. 2, it is also assumed that individual segments have uniform diameters given by the average values across their lengths. While these assumptions may result in numerical inaccuracies, that is offset by the gain from the physical and intuitive feel for the design of such sensors for weighted vibration analysis.

Figure 3:
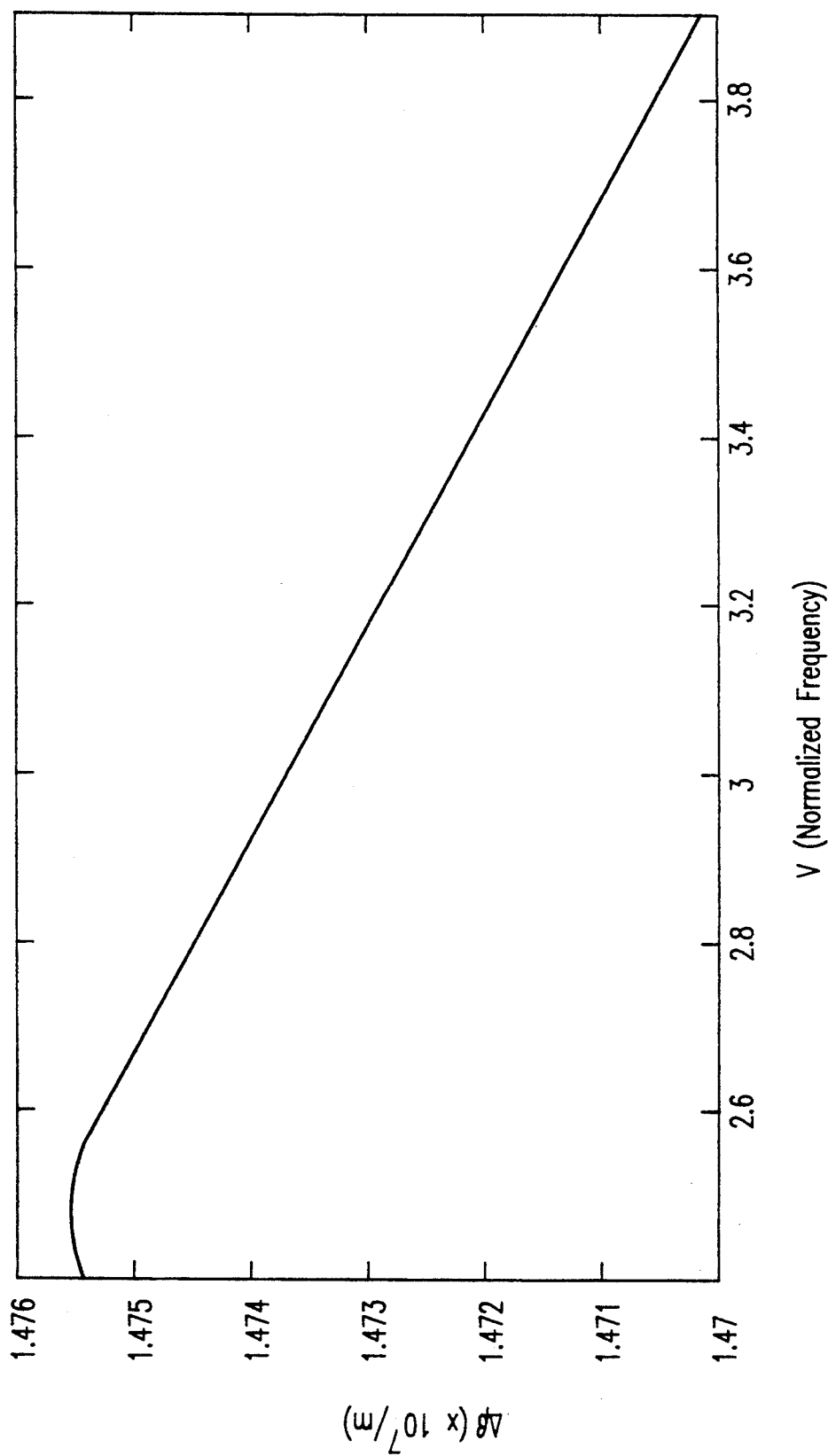
FIG. 3 is a graph showing the variation of the differential propagation constant as a function of normalized frequency.

The characteristic (or eigenvalue) equation for the $LP_{lm}$ mode is given by $$\frac{U_{lm}J_{l-1}(U_{lm})}{J_l(U_{lm})} = -\frac{W_{lm}K_{l-1}(W_{lm})}{K_l(W_{lm})}, \quad (15)$$

where $U_{lm}^2 = k_0^2 a^2 (n_1^2 - \beta_{lm}^2)$ and $W_{lm}^2 = k_0^2 a^2 (\beta_{lm}^2 - n_2^2)$. Equation (15) can be evaluated numerically to generate the normalized propagation constants $b_{01}$ and $b_{11}$ for $LP_{01}$ and $LP_{11}$ modes, respectively, as functions of the normalized frequency, V. The conventional definition for the normalized propagation constant is $$b_{lm} = \frac{\frac{\beta_{lm}^2}{k_0^2} - n_2^2}{n_1^2 - n_2^2}, \quad (16a)$$

and the conventional definition for the normalized frequency is $$V = \frac{2\pi a}{\lambda}\sqrt{n_1^2 - n_2^2}. \quad (16b)$$

where $k_0$ is the free space propagation constant given by $2\pi/\lambda$, $n_1$ is the core refractive index, $n_2$ is the cladding refractive index, $\lambda$ is the free space wavelength of the source and a is the fiber core radius. The differential propagation constant as a function of V can be obtained, as shown in FIG. 3. In the graph of FIG. 3, $n_1 = 1.5$ and $n_2 = 1.47$. Only the range of values for V ($2.4 < V < 3.8$) over which no modes other than the $LP_{01}$ and $LP_{11}$ modes propagate are of interest here. For a fiber with a linear taper, the $\Delta\beta''(x)$ is plotted in FIG. 4. A similar plot for a fiber with an exponential profile is shown in FIG. 5.

Figure 4:
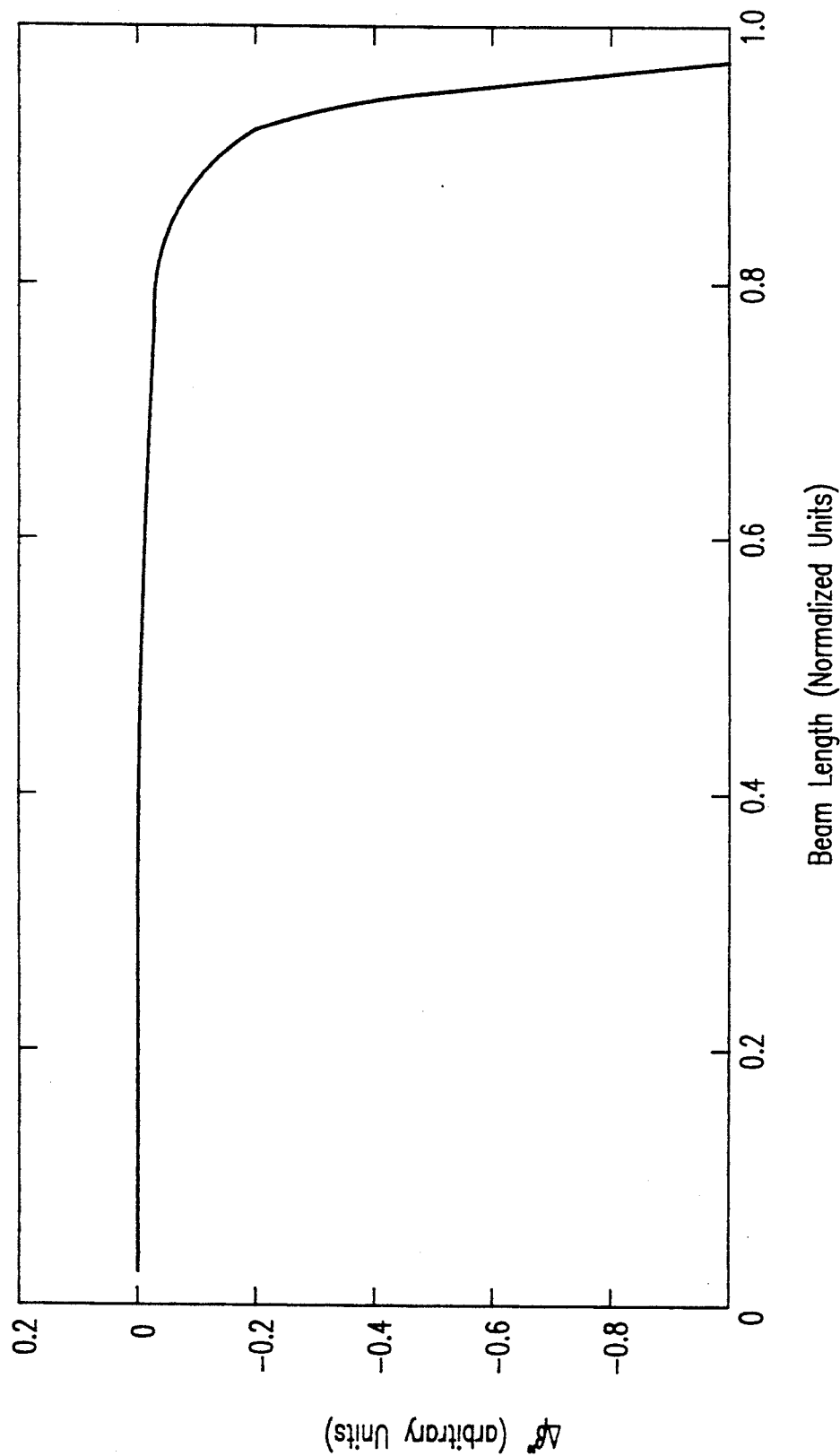
FIG. 4 is a graph showing a weighting function $\Delta\beta''(x)$ with length for a linear taper.
Figure 5:
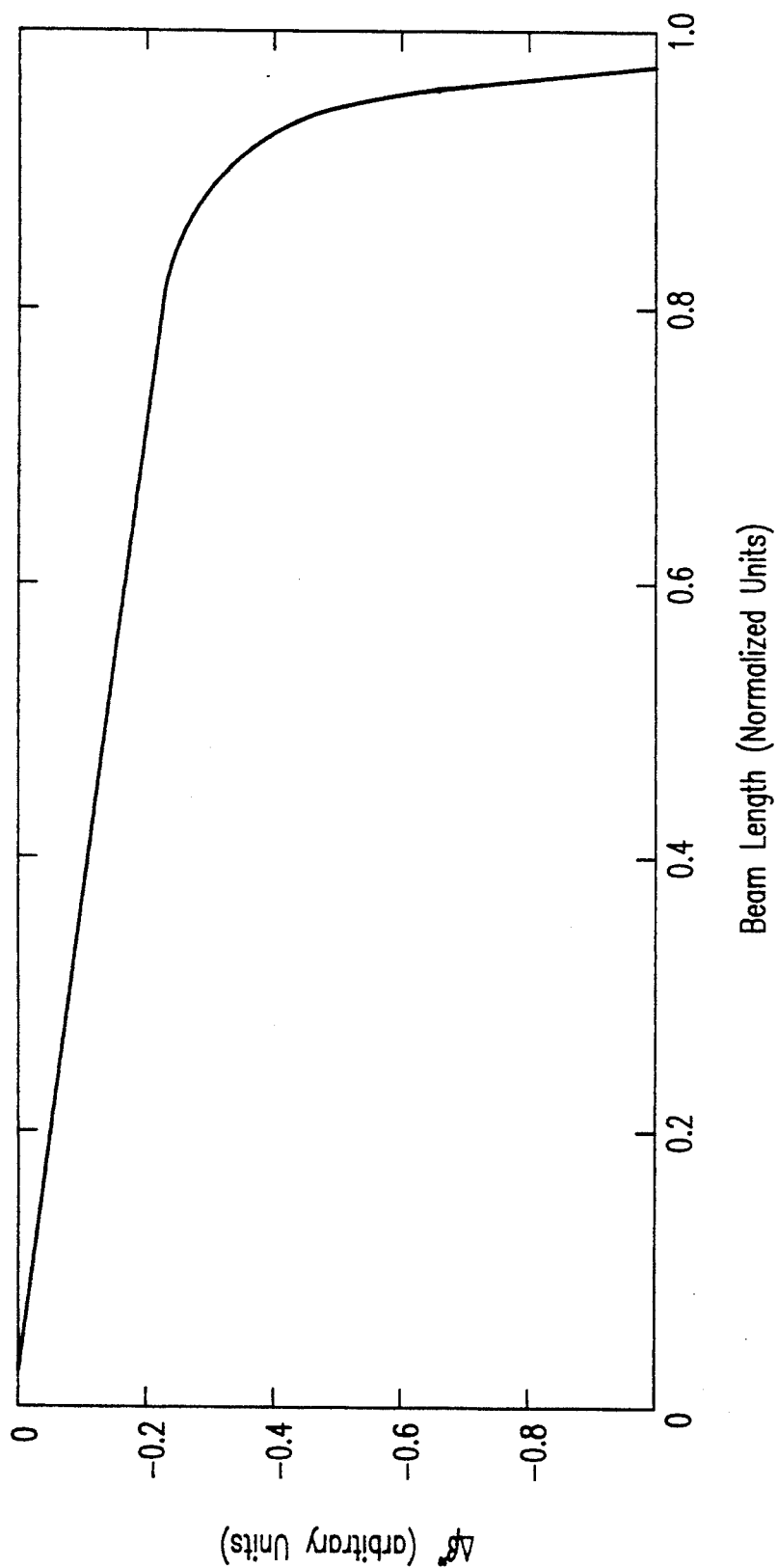
FIG. 5 is a graph showing the weighting function $\Delta\beta''(x)$ with an exponential taper.
Figure 6A:
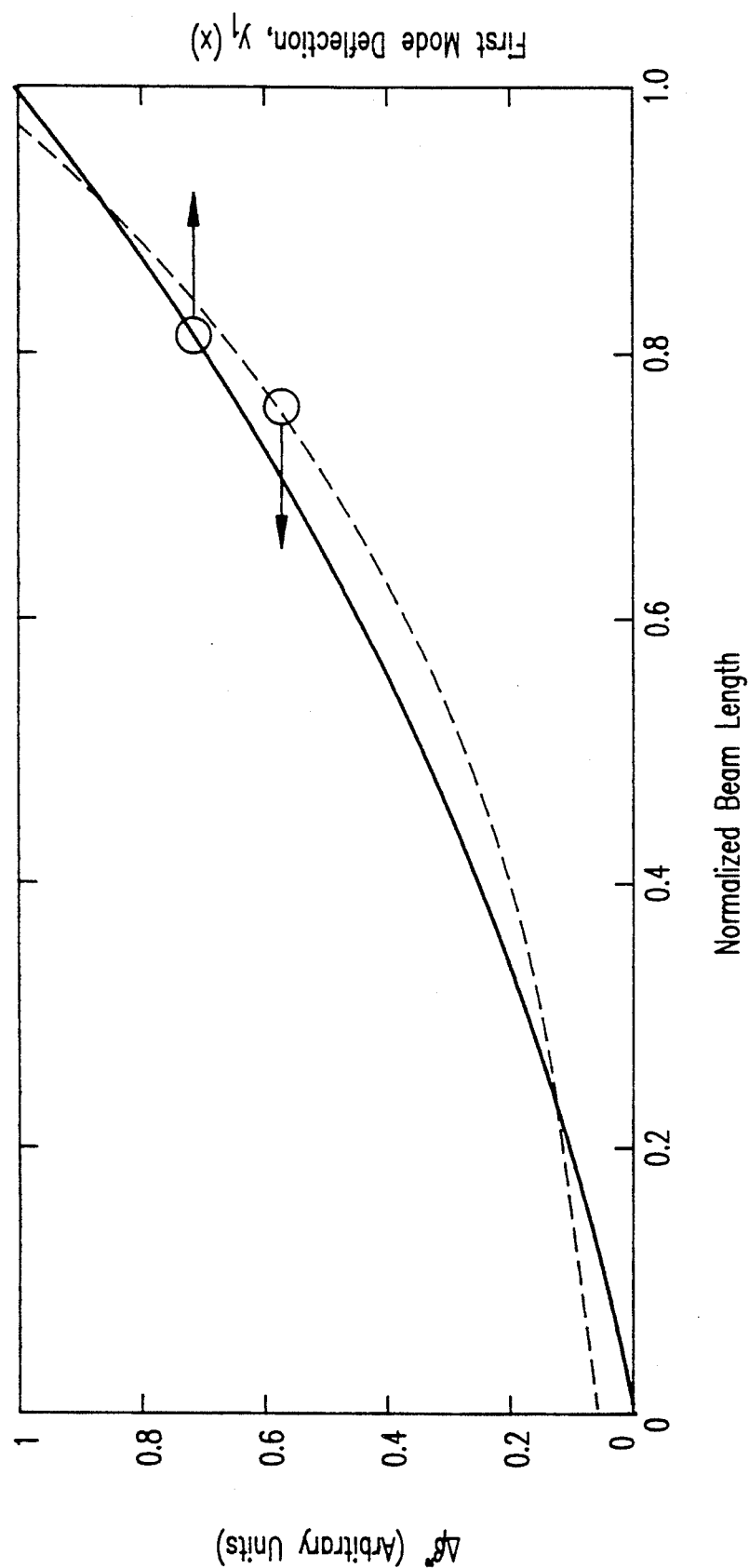
FIGS. 6A and 6B are graphs showing the superposition of weighting function and first-vibration-mode shape as a function of normalized beam length for, respectively, a linear fiber taper and an exponential taper fiber.
Figure 6B:
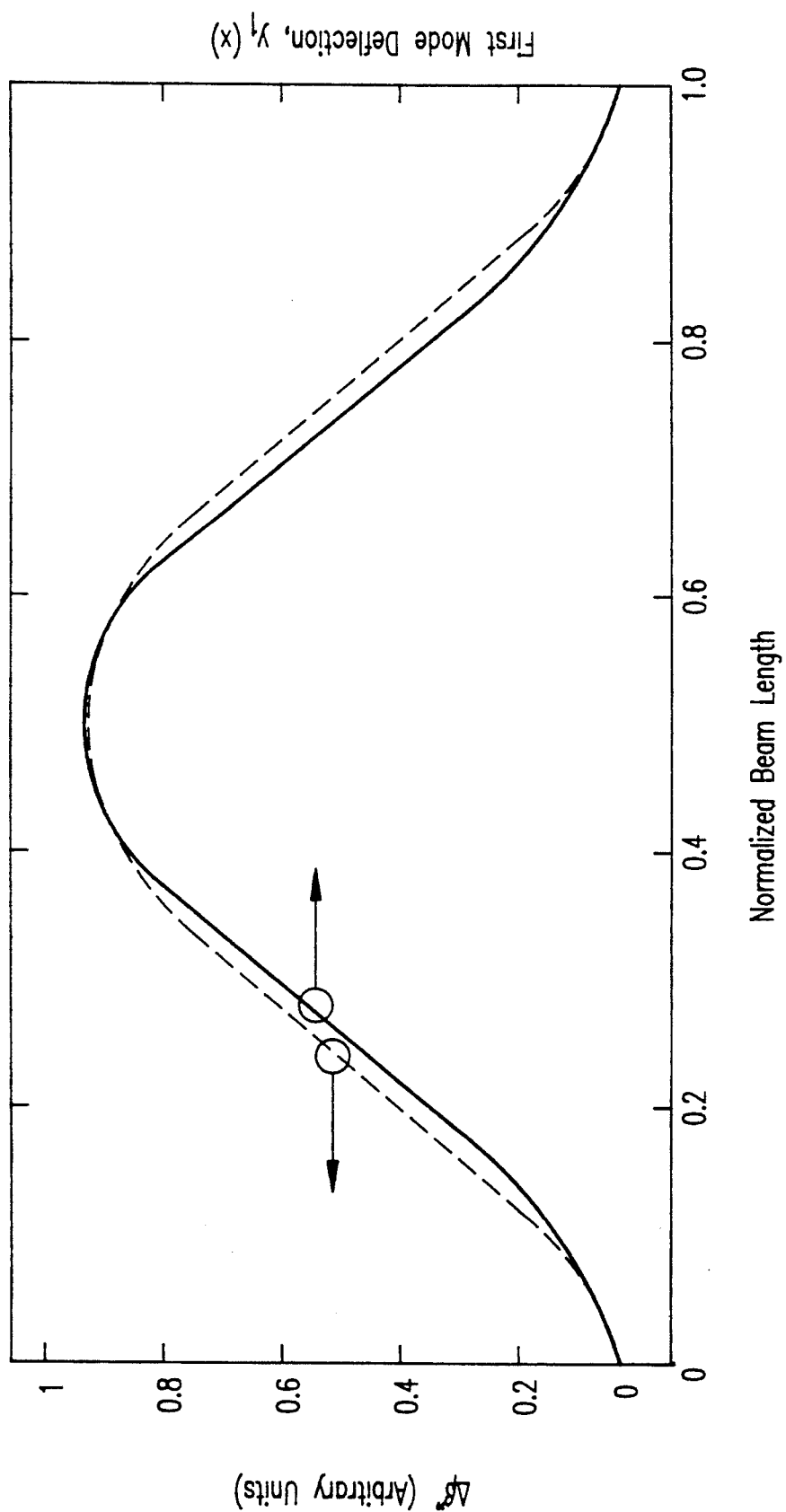

A comparison of FIGS. 1 and 4 shows that linear or exponential tapers can produce $\Delta\beta''(x)$ profiles that resemble some of the vibration mode shapes of one dimensional beams. Hence, by using the orthogonality property of the modes and Equation (14), it is possible to tailor fiber profiles to produce vibration selective weighted sensors. A direct superposition of the mode shapes and the $\Delta\beta''(x)$ function for different taper profiles shows good correlation. In FIG. 6A, a taper with the minimum radius of the fiber, $a_{min} = 1$ $\mu$m, and the maximum radius, $a_{max} = 1.15$ $\mu$m, with a linear taper over the length of the beam is was used. Similarly, the exponential taper can be tailored such that the weighting function matches the first mode of the clamped-clamped beam. This is shown in FIG. 6B for a radius profile described by the equation $$a = 3.02 \times 10^{-7} \exp(-5x) + 8.98 \times 10^{-7} \quad (17)$$

over half the beam normalized length. These two examples demonstrate the possibility of tailoring the weighting profiles as desired for any mode of the one dimensional beam. For higher order vibration modes, the tapers will be more complex with at least one point of inflection between the two end points.

Experiments

Figure 7A:
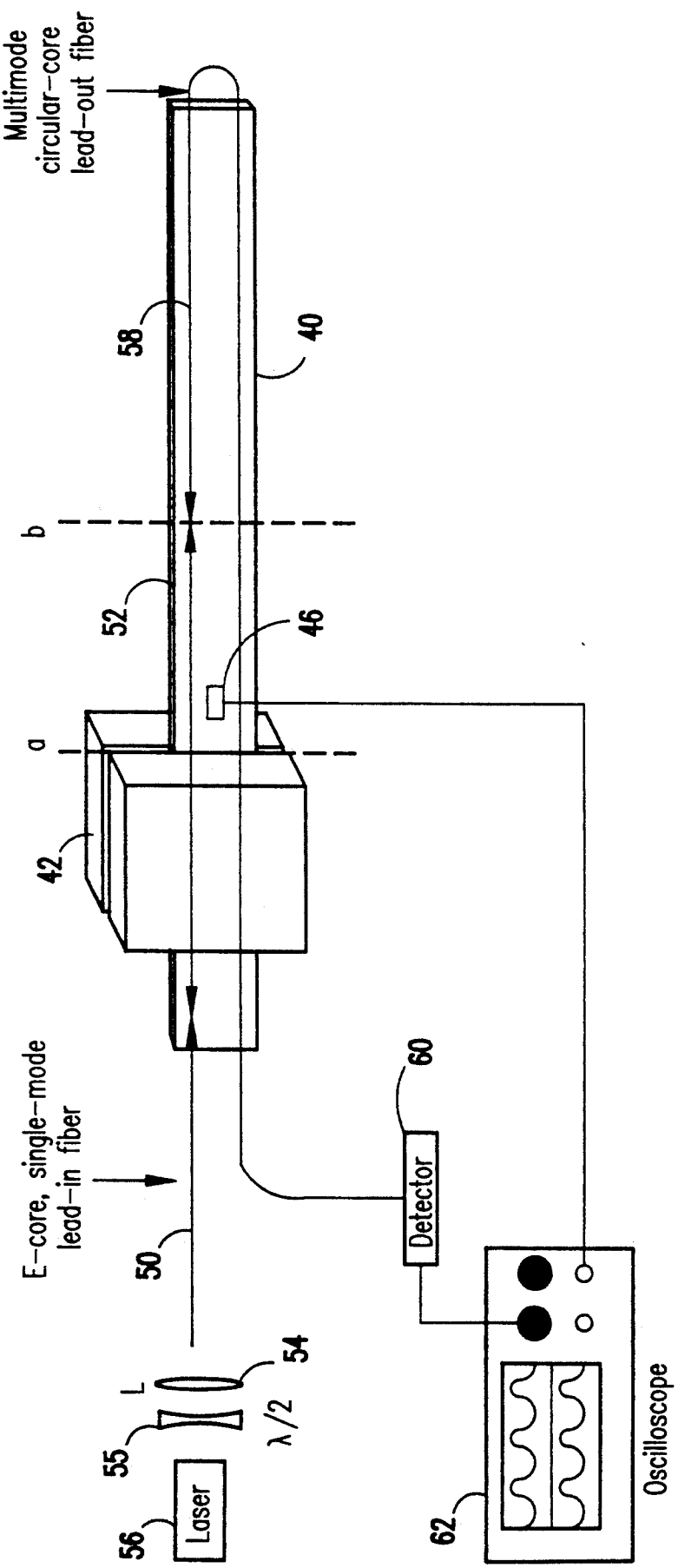
FIGS. 7A and 7B are pictorial and block diagrams showing the experimental setup for testing the weighted fiber sensors for a clamped-free beam and a clamped-clamped beam, respectively.
Figure 7B:
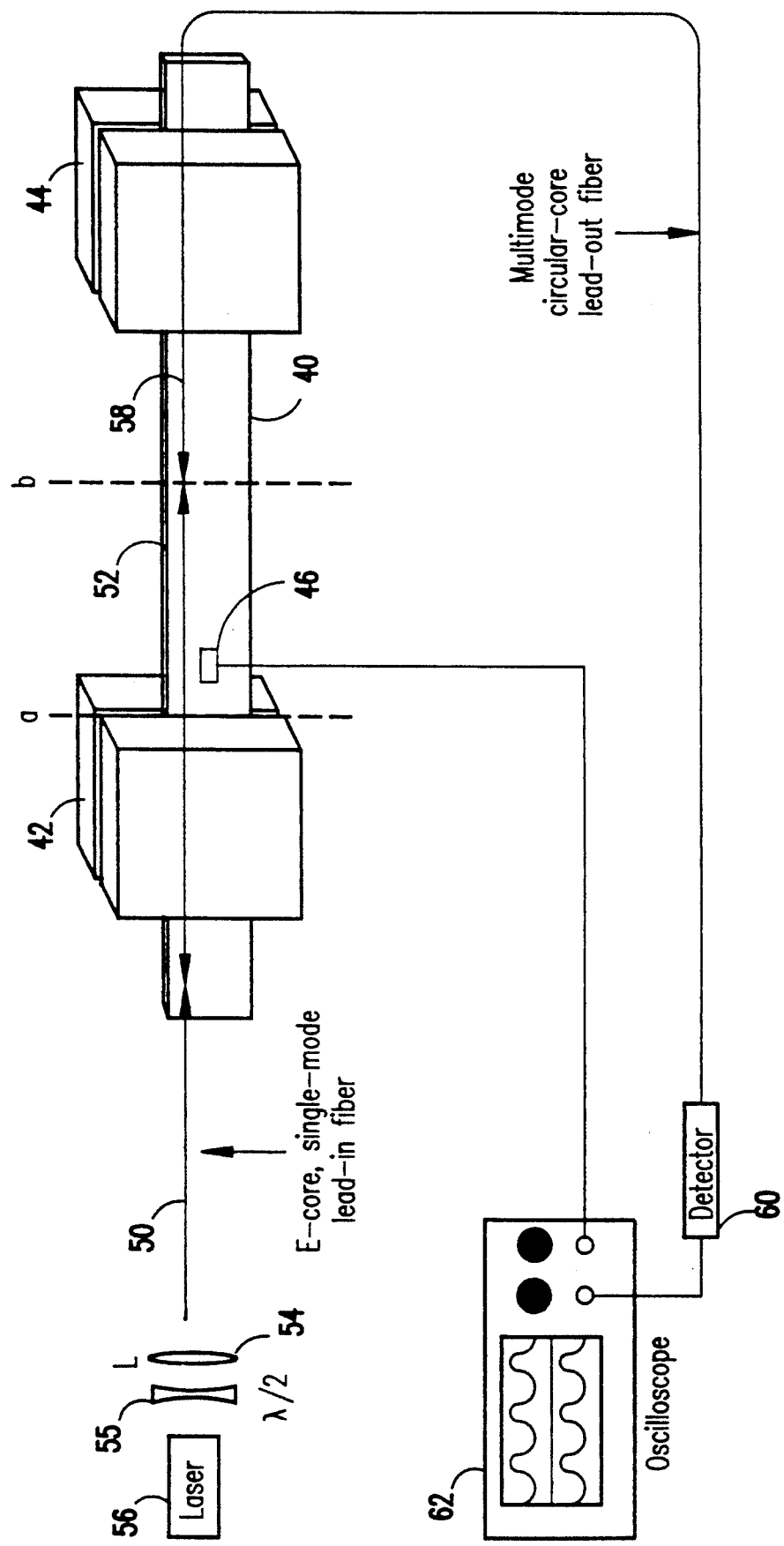

Schematics of the experimental setup for vibration sensing of one-dimensional beams configured in the clamped-clamped and clamped-free arrangements are shown in FIGS. 7A and 7B, respectively, wherein like reference numerals represent the same or similar elements. A beam 40 is clamped at one end in a clamp 42. In FIG. 7A, the opposite end of the beam 40 is free, while in FIG. 7B, the opposite end of the beam is clamped in a second clamp 44. A piezo-electric patch 46 is affixed to the beam 40 to generate a reference signal. A lead-in, single-mode e-core fiber 50 is fused to a tapered circular-core, two-mode fiber 52. The lead-in fiber 50 has an end adjacent a lens 54 and half wave plate 55 on the opposite side of which is a laser 56 for launching a light beam to the tapered fiber 52. The tapered fiber 52 is attached to the beam 40 to be subject to the strains imposed on the beam. A lead-out, multi-mode circular-core fiber 58 provides and output to a detector 60. The detector generates an electrical signal supplied to one trace of a dual-trace oscilloscope 62. The other trace of the oscilloscope 62 is generated from the reference signal from the piezo-electric patch 46.

In all experiments, the sensor fiber 52 had an insensitive, lead-in, single-mode e-core fiber 50 and an offset-spliced, lead-out multimode fiber 58 that would spatially filter the contribution from only one of the two lobes at the output of the sensing region. In FIGS. 7A and 7B, a and b denote endpoints of the sensors 52 (expressed in terms of normalized length values), and the fusion splices are indicated by crosses on the fiber. Note that the extra section of sensing fiber that extends from the short extension of the beam to the clamp on the left is used to set the quadrature point of operation by applying a static load.

Figure 8A:
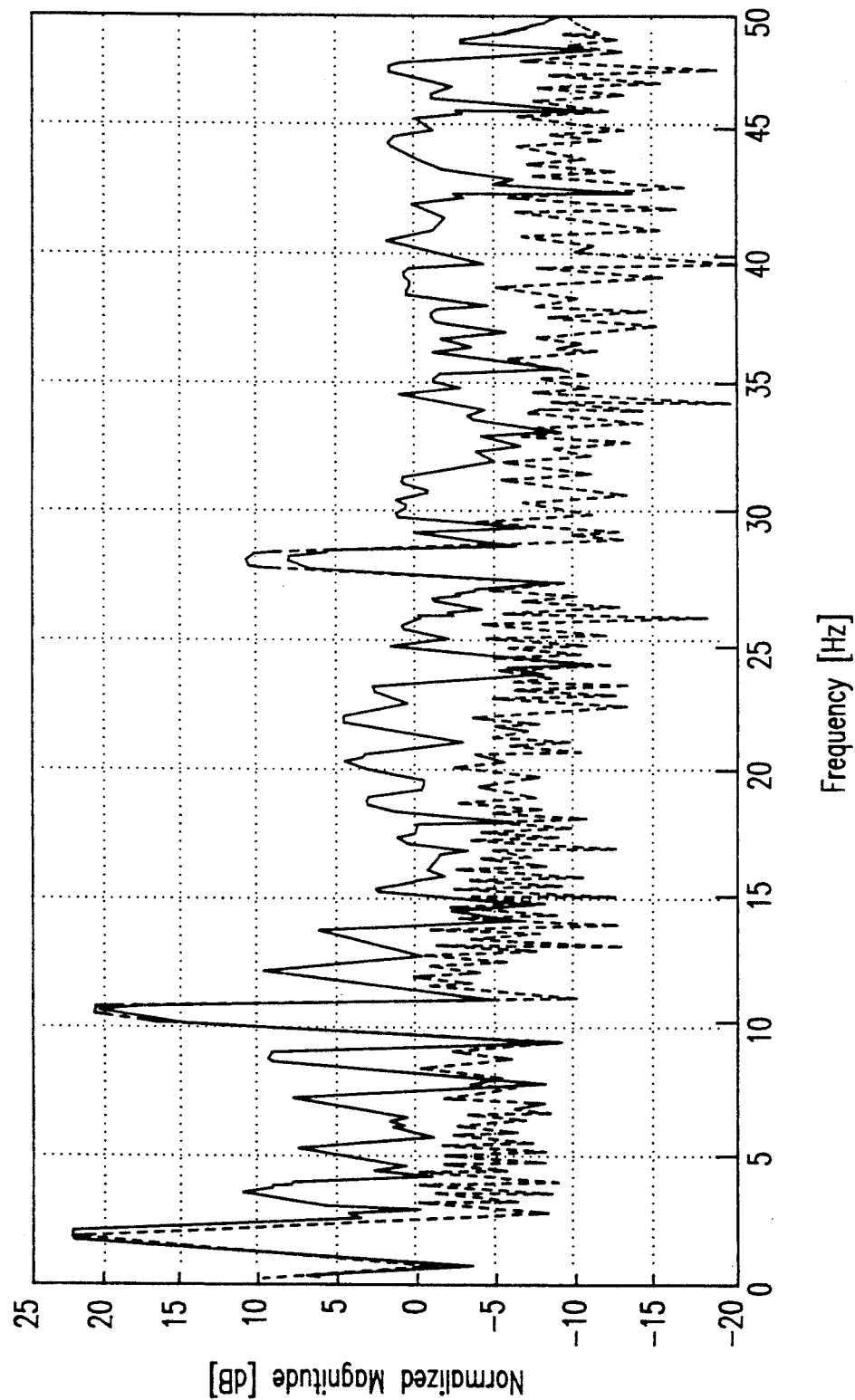
FIGS. 8A and 8B are graphs respectively showing fast Fourier transforms of signals from a conventional e-core fiber sensor and a tapered fiber sensor according to the invention for a clamped-free beam.

A conventional e-core sensor was adhered to a clamped-free beam (a=0, b=0.61), shown in FIG. 7A. Output signals from the piezo-electric patch 46 attached to the beam 40 was compared to the signals obtained form the fiber sensor. The first three modes of vibration of the beam were excited and the outputs from the fiber optic sensor and the piezo-electric patch were monitored. In FIG. 8A, there are shown fast Fourier transforms (FFTs) of oscilloscope waveforms. The solid line represents the fiber sensor, while the dotted line represents the piezo-electric sensor. FIG. 8A shows that the fiber sensor enhances the first mode of vibration in comparison with the piezo-electric sensor and picks up other modes of vibration fairly well with reduced sensitivities on the order of 2 to 4 dB for the second and third modes, respectively. A comparison between the theoretically expected values for the beam frequencies and those detected by the fiber sensor are given in Table I.

TABLE I

| NATURAL VIBRATION FREQUENCIES: CLAMPED-FREE BEAM #1 | | | |
|---|---|---|---|
| MODE # → | 1 | 2 | 3 |
| EXPERIMENT (Hz) | 1.73 | 10.47 | 28.75 |
| THEORY (Hz) | 1.13 | 10.10 | 28.06 |

Figure 8B:
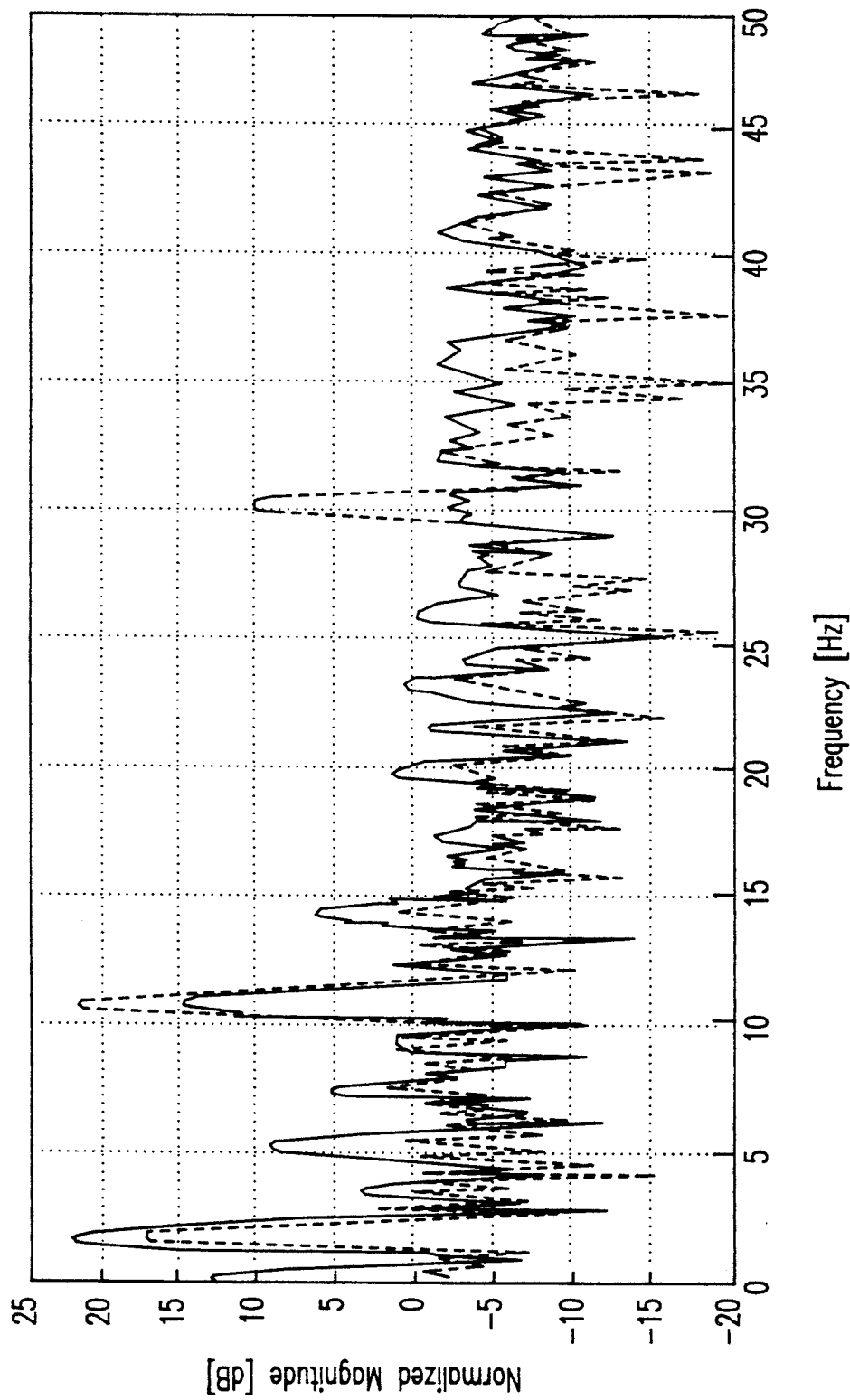

A weighted fiber sensor with a taper that matches the $\Delta\beta''(x)$ weighting function to the first mode of the clamped-free beam, as shown in FIG. 6A, was built. The sensing fiber was fabricated on a draw tower by varying the preform-feed and fiber-pull speeds as well as controlling the temperature of the furnace while the fiber was being drawn. The tapers could also be made on a coupler station used conventionally for fabricating fused-biconical-tapered couplers. The weighted fiber was attached to another clamped-free beam, as shown in FIG. 7A, between the same endpoints (a=0, b=0.61) as in the conventional case described above. Results obtained from the weighted fiber sensor are shown in FIG. 8B, where again the sold line represents the signal from the fiber sensor and the dotted line represents the signal from the piezo-electric sensor. The FFTs of the fiber sensor and the piezo-electric patch show that the second mode has been suppressed by 7 dB and the third mode by 12 dB in comparison to the piezo-electric sensor output. A comparison between the theoretically expected values for the beam frequencies and those detected by the fiber sensor are given in Table II.

TABLE II

| NATURAL VIBRATION FREQUENCIES: CLAMPED-FREE BEAM #2 | | | |
|---|---|---|---|
| MODE # → | 1 | 2 | 3 |
| EXPERIMENT (Hz) | 1.81 | 10.97 | 30.56 |
| THEORY (Hz) | 1.22 | 10.98 | 30.52 |

Figure 9A:
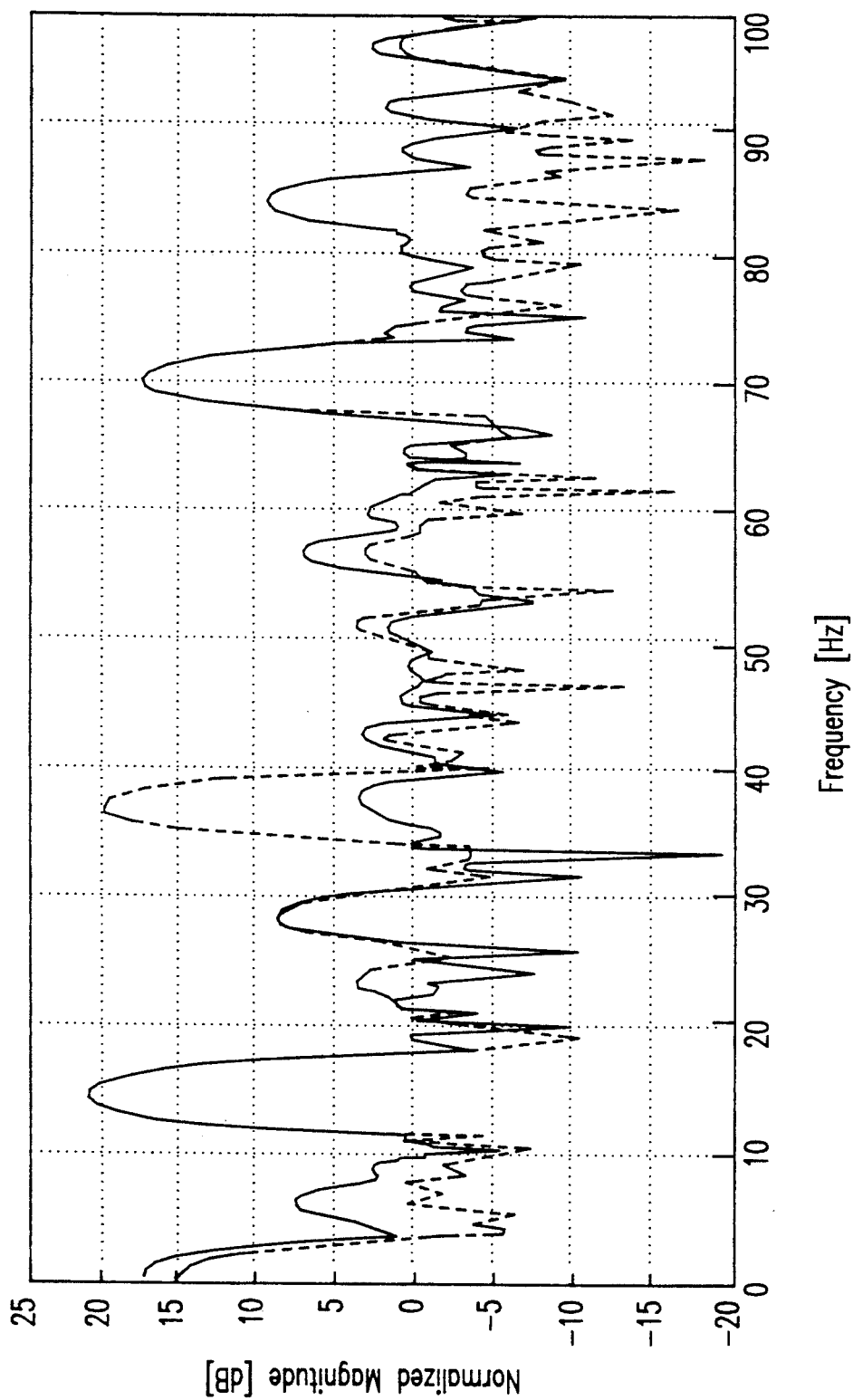
FIGS. 9A and 9B, are graphs respectively showing fast Fourier transforms of signals from a conventional e-core fiber sensor and a tapered fiber sensor according to the invention for a clamped-clamped beam.

A conventional e-core sensor was attached to a clamped-clamped beam as shown in FIG. 7B with the end-points placed between the antinodes of the second mode of vibration (a=0, b=0.75). From Equation (13), since the slopes of the deflections for the second mode are identically zero at both endpoints of the sensor, this sensor would act like a vibration-mode filter. The FFTs resulting from the output signal, shown in FIG. 9A confirm this theory. A comparison between the theoretically expected values for the beam frequencies and those detected by the fiber sensor are given in Table III.

TABLE III

| NATURAL VIBRATION FREQUENCIES: CLAMPED-CLAMPED BEAM #1 | | | |
|---|---|---|---|
| MODE # → | 1 | 2 | 3 |
| EXPERIMENT (Hz) | 14.25 | 36.88 | 70.63 |
| THEORY (Hz) | 14.01 | 38.92 | 76.27 |

Figure 9B:
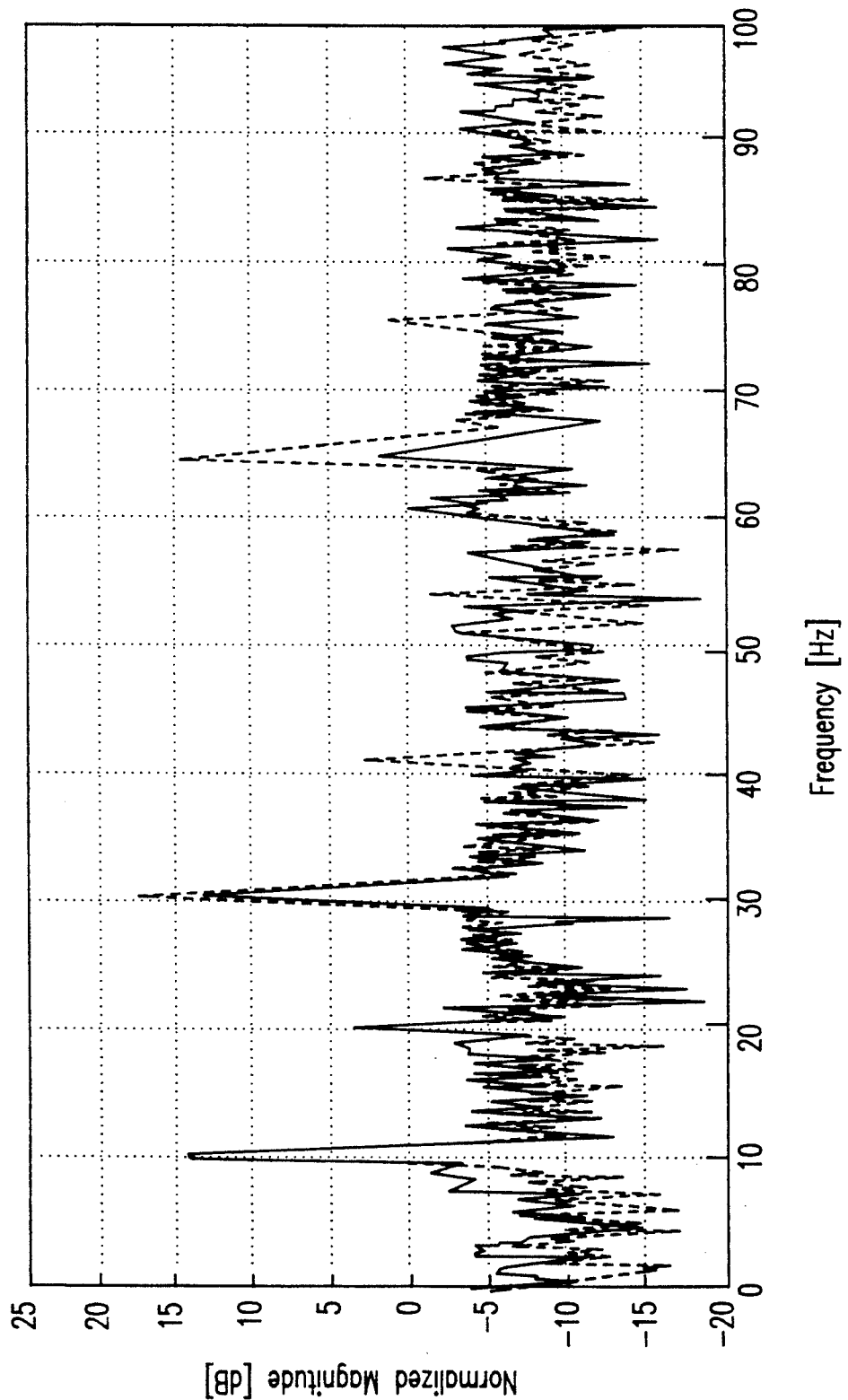

A tapered two-mode circular fiber with a profile that matched the first mode of vibration for a clamped-clamped beam shown in FIG. 6B was placed between the same end-points in FIG. 7B as the conventional e-core sensor described earlier. The FFTs resulting from the output signal are shown in FIG. 9B. The second mode is suppressed by 3.5 dB and the third mode by 12 dB in comparison with the piezo-electric sensor. In comparison with the conventional e-core sensor result shown in FIG. 9A, however, the second mode detection has been enhanced implying that the sensor placement has no effect on the tapered fiber sensor. The relatively low suppression of the second mode of the beam can be attributed to the fact that the fiber did not span the entire length of the beam. Since the orthogonality relationship holds only over the entire length, one would expect a noticeable contribution from the other modes. A comparison between the theoretically expected values for the beam frequencies and those detected by the fiber sensor are given in Table IV.

TABLE IV

| NATURAL VIBRATION FREQUENCIES: CLAMPED-CLAMPED BEAM #2 | | | |
|---|---|---|---|
| MODE # → | 1 | 2 | 3 |
| EXPERIMENT (Hz) | 10.69 | 31.25 | 66.25 |
| THEORY (Hz) | 11.90 | 33.06 | 64.80 |

The invention provides spatially distributed fiber optic sensors with intrinsic weighting functions for selective vibration modal analysis. Tapering two-mode fibers is permits achieving a spatially weighted sensitivity function. Therefore, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A two-mode, elliptical-core, vibration-modal optical fiber sensor comprising an elliptical-core, single-mode lead-in optical fiber, a tapered two-mode sensing optical fiber, and a multimode circular-core lead-out optical fiber characterized by said tapered two-mode sensing optical fiber producing a differential phase-modulation between $LP_{01}$ and $LP_{11}^{even}$ modes of light propagating in said two-mode sensing optical fiber due to a stress applied thereto and having a weighting function which varies along the length of the fiber, said differential phase-modulation producing a spatial interference pattern having a plurality of lobes, and said multimode circular-core lead-out optical fiber picking up only one of the lobes of the spatial interference pattern result lobes of the spatial interference pattern resulting from the interaction between the $LP_{01}$ and $LP_{11}^{even}$ modes in the tapered two-mode sensing optical fiber and acting as a spatial filter.

2. The optical fiber sensor recited in claim 1 wherein strain sensitivity of the tapered two-mode sensing optical fiber is a function of distance along the length of the tapered two-mode sensing optical fiber.

3. The optical fiber sensor recited in claim 1 wherein strain sensitivity of the tapered two-mode sensing optical fiber is tailored to a specific transducer application according to said weighting function for the application.

4. The optical fiber sensor recited in claim 1 wherein said tapered two-mode sensing optical fiber has a linear taper.

5. The optical fiber sensor recited in claim 1 wherein said tapered two-mode sensing optical fiber has an exponential taper.

* * * * *